(12) United States Patent  
White

(10) Patent No.: US 8,955,815 B2  
(45) Date of Patent: Feb. 17, 2015

(54) SUPPORTING DEVICE FOR ELECTRONIC APPARATUSES

(71) Applicant: ACCO Brands Corporation, Lincolnshire, IL (US)

(72) Inventor: Ryan White, Salem, MA (US)

(73) Assignee: ACCO Brands Corporation, Lake Zurich, IL (US)

(*) Notice: Subject to any disclaimer, the term of this patent is extended or adjusted under 35 U.S.C. 154(b) by 8 days.

(21) Appl. No.: 13/689,492

(22) Filed: Nov. 29, 2012

(65) Prior Publication Data

US 2013/0193299 A1 Aug. 1, 2013

Related U.S. Application Data

(60) Provisional application No. 61/587,313, filed on Jan. 17, 2012.

(51) Int. Cl.
*F16M 13/00* (2006.01)
*F16M 11/00* (2006.01)
*F16M 11/10* (2006.01)
*G06F 3/02* (2006.01)

(52) U.S. Cl.
CPC ............. *F16M 11/00* (2013.01); *F16M 11/10* (2013.01); *F16M 13/00* (2013.01); *G06F 3/0208* (2013.01); *Y10S 248/917* (2013.01); *Y10S 248/919* (2013.01)
USPC ........... 248/558; 248/917; 248/919; 248/445; 248/459; 206/320; 361/679.44

(58) Field of Classification Search
USPC ......... 248/445, 446, 447, 448, 449, 450, 455, 248/456, 457, 459, 461, 917–923, 558, 248/441.1; 29/592.1, 428; 361/679.44, 361/679.06, 679.26, 679.27, 679.55, 361/679.56, 679.3; 206/305, 320
See application file for complete search history.

(56) References Cited

U.S. PATENT DOCUMENTS

| | | | | |
|---|---|---|---|---|
| 1,379,612 A | * | 5/1921 | Baver | 248/459 |
| 4,674,724 A | * | 6/1987 | Gaudet | 248/459 |
| 4,709,895 A | * | 12/1987 | Mardak | 248/460 |
| 4,722,504 A | * | 2/1988 | Degenholtz | 248/459 |

(Continued)

OTHER PUBLICATIONS

International Search Report for Application No. PCT/US2012/067546, dated Feb. 12, 2013 (6 pages).

(Continued)

*Primary Examiner* — Monica Millner
(74) *Attorney, Agent, or Firm* — Michael Best & Friedrich LLP

(57) ABSTRACT

A supporting apparatus is disclosed. The supporting apparatus has a supporting device comprising a plurality of connected planar panels with a first panel, a second panel, an optional third panel, a fourth panel, and a fifth panel, and a locking component coupled to an edge region of at least one of the planar panels. The supporting apparatus further comprises a restraining unit configured to engage the series of connected panels such that the such that an edge of each of the first panel, the second panel, the fourth panel, and the fifth panel is restricted to movement within a base plane, the base plane being aligned with an orientation of the restraining unit, while another edge of each of the first panel, the second panel, the fourth panel, and the fifth panel is capable of moving out of the base plane. The electronic device can be a keyboard, a tablet computer, etc.

20 Claims, 3 Drawing Sheets

(56) References Cited

U.S. PATENT DOCUMENTS

| | | | | |
|---|---|---|---|---|
| 4,770,385 | A | * | 9/1988 | Bahm .................... 248/292.13 |
| 5,149,047 | A | * | 9/1992 | Tucker ........................ 248/459 |
| 5,154,389 | A | * | 10/1992 | Hodgin ..................... 248/441.1 |
| 5,337,985 | A | | 8/1994 | Hale |
| 5,722,628 | A | * | 3/1998 | Menaged ................... 248/441.1 |
| 5,826,840 | A | | 10/1998 | Yun |
| 6,082,696 | A | * | 7/2000 | Patterson ...................... 248/454 |
| 6,435,466 | B1 | * | 8/2002 | Adams ......................... 248/455 |
| 6,557,897 | B1 | * | 5/2003 | Gaudet ........................... 281/33 |
| 6,585,217 | B2 | | 7/2003 | Huang et al. |
| 6,682,042 | B2 | * | 1/2004 | Anderson ..................... 248/460 |
| 7,108,234 | B2 | | 9/2006 | Ritchey et al. |
| 7,861,995 | B2 | * | 1/2011 | Liou ............................. 248/454 |
| 8,282,065 | B1 | * | 10/2012 | Stone ........................... 248/454 |
| 8,360,384 | B2 | * | 1/2013 | Farris-Gilbert et al. ...... 248/459 |
| 8,424,829 | B2 | * | 4/2013 | Lu et al. ........................ 248/371 |
| 8,434,601 | B2 | * | 5/2013 | Hou et al. ......................... 190/1 |
| 2001/0045500 | A1 | * | 11/2001 | Krug ........................... 248/205.3 |
| 2002/0171020 | A1 | * | 11/2002 | Huang et al. ............. 248/346.01 |
| 2002/0172002 | A1 | | 11/2002 | Sasaki et al. |
| 2003/0047659 | A1 | * | 3/2003 | Evans ........................... 248/459 |
| 2003/0057343 | A1 | * | 3/2003 | Jacobs ........................ 248/441.1 |
| 2004/0135052 | A1 | * | 7/2004 | Hecker .......................... 248/459 |
| 2006/0285283 | A1 | * | 12/2006 | Simonian et al. ............. 361/679 |
| 2011/0278421 | A1 | * | 11/2011 | Guldalian ..................... 248/459 |
| 2012/0037047 | A1 | * | 2/2012 | Moldovan .......................... 108/3 |
| 2013/0068919 | A1 | * | 3/2013 | Antonioni ..................... 248/614 |
| 2013/0093304 | A1 | * | 4/2013 | Childs et al. .................. 312/240 |
| 2013/0114198 | A1 | * | 5/2013 | Gengler .................... 361/679.08 |
| 2013/0175200 | A1 | * | 7/2013 | Poon et al. ................... 206/759 |
| 2013/0175423 | A1 | * | 7/2013 | Coberly ........................ 248/558 |
| 2013/0240704 | A1 | * | 9/2013 | Andrews ....................... 248/454 |

OTHER PUBLICATIONS

International Preliminary Report on Patentability and Written Opinion for Application No. PCT/US2012/067546, dated Jul. 31, 2014 (6 pages).

* cited by examiner

SUPPORTING DEVICE FOR ELECTRONIC APPARATUSES

CROSS-REFERENCE TO RELATED APPLICATIONS

This application is a non-provisional of U.S. Provisional Application No. 61/587,313, filed on Jan. 17, 2012, which is hereby incorporated by reference in its entirety for all purposes.

BACKGROUND

Traditionally, desktop computers were provided with keyboards that could be placed on a flat surface. While a user could reposition the keyboard to other locations on the surface, other movement flexibilities were limited. For example, a tilt of the keyboard would remain fixed. A manufacturer may attempt to identify an optimal keyboard tilt, though the optimum may in fact depend on a specific user's precise computer set up. Thus, while a tilt may be optimal for a first user, inter-user variation in factors such as desk height may mean that the tilt is sub-optimal for another user. Sub-optimal tilts may lead to reduced user comfort and even pain and injuries.

Embodiments of the invention address these and other problems, individually and collectively.

BRIEF SUMMARY

Embodiments of the invention relate to keyboard-supporting devices and systems, as well as methods for making and using security apparatuses.

One embodiment of the invention is directed to a supporting apparatus for an electronic device. The supporting apparatus includes a supporting device comprising a plurality of connected planar panels comprising a first panel, a second panel, an optional third panel, a fourth panel, and a fifth panel, and a locking component coupled to an edge region of the first panel within the plurality of panels. The supporting apparatus further comprises a restraining unit configured to engage the series of connected panels, such that at least one edge of each of the first panel, the second panel, the fourth panel, and the fifth panel is restricted to movement within a base plane that is aligned with an orientation of the restraining unit. At least one other edge of each of the first panel, the second panel, the fourth panel, and the fifth panel may be capable of moving out of the base plane. The optional third panel, when included, is restricted to movement within the base plane. The electronic device can be a keyboard, a tablet computer, laptop, etc.

Other embodiments of the invention can be directed systems including the above-described supporting apparatus, and an electronic device that is supported by the supporting apparatus.

Another embodiments of the invention is directed to a method for supporting an electronic device. A supporting apparatus is accessed. The supporting apparatus includes a series of connected planar panels comprising a first panel, a second panel, an optional third panel, a fourth panel, and a fifth panel. The supporting apparatus further includes a locking component coupled to an edge region of at least one of the planar panels. A panel of the series of connected planar panels is moved such that an apex is formed via two adjacent panels of the connected planar panels. The series of connected planar panels is locked such that the apex is fixed. A tilt of the electronic device supported by the supporting device depends on a height of the apex.

These and other embodiments of the invention are described in further detail below.

DETAILED DESCRIPTION

Embodiments of the invention relate to a supporting apparatus with a supporting device that may be easily adjusted to allow for variation in a position of a supported keyboard (or other type of electronic device). Specifically, the supporting device may include multiple pairs of panels—one pair being provided near a front of the supporting device, and another pair being provided near a back of the supporting device. With regard to each pair, the panels of the pair may be coupled to each other at a pivot line (e.g., via a hinge). A front edge of one panel and a back edge of an adjacent panel may be configured to slide along rails along a length of the supporting device. As then one panel's front edge is slid close to the adjacent panel's back edge, the pivot line may move further from the rails, thereby affecting a height of the supporting device at the pivot line. A keyboard positioned on the supporting apparatus may thus be tilted forwards when the back pair of panels are compressed (raising a back portion of the supporting device) or tilted backwards when the front pair of panels are compressed (raising a front portion of the supporting device).

Figure 1A:
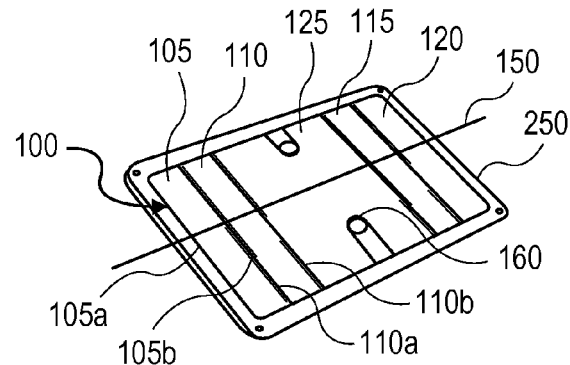
FIGS. 1A-1C show rear perspective views of a keyboard-supporting device arranged in various configurations.
Figure 1B:
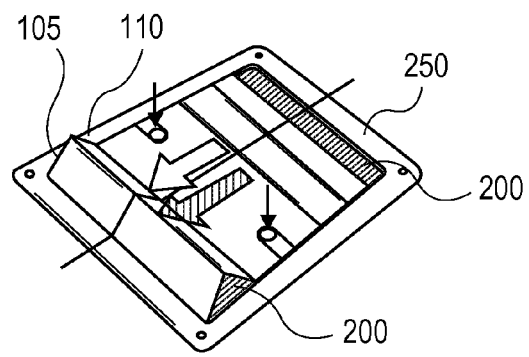
Figure 1C:
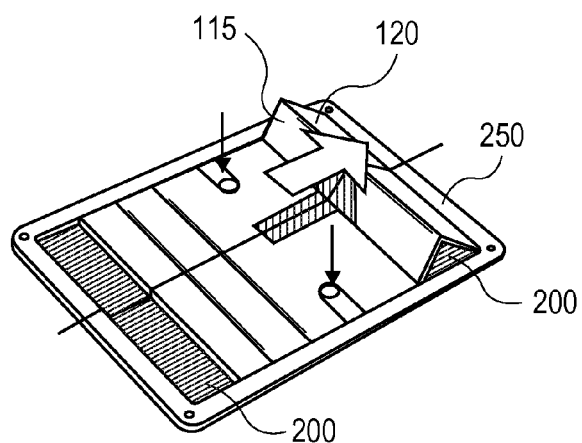

FIGS. 1A-1C show a supporting apparatus comprising a frame 250, and supporting device 100 engaged and exposed by the frame 250. As shown, the keyboard-supporting device 100 includes a plurality (e.g., five) of interconnected panels 105, 110, 115, 120 and 125. Panels 105, 110, 115, 120 and 125 can each be substantially flat and substantially rectangular in shape. They can be made of any suitable material including a plastic material. In this embodiment, panel 125 is a central third panel and is larger (e.g., twice as wide) than outer panels 105, 110, 115, 120. In some instances, a width (i.e., characterizing a dimension of the panel along the axis 150) of each of one or more of panels 105, 110, 115 and 120 is between ¼ inch and 2 inches. In some instances, a width of panel 125 is between 1 inch and 6 inches. Adjacent panels in the plurality of panels can be coupled together via a rotation-enabling component, such as a hinge.

FIG. 1A shows an instance in which all five panels are flat along a base plane. However, the panels may be compressed in an accordion style along a length-wise axis 150. Specifically, part or all of one or more panels may engage with a rail system associated with frame 250, to thereby prevent one or more vertically fixed edges from changing in heights relative to the base plane. For example, engagement of the first panel 125 with a rail system may prevent edge 110*b* from moving perpendicular to the base plane. These rail-locked edges may then move along axis 150 (e.g., via movement along the rails). Further, one or more panels may each include a vertically non-fixed edge. Heights of these vertically non-fixed edges may depend on locations of the vertically fixed edges along axis 150 relative to positions of other vertically fixed edges.

Each panel may be coupled to one or more adjacent panels, e.g., as shown in FIGS. 1A-1C. The panel may be able to pivot relative to one or more adjacent panels, such that, e.g., a surface of the panel is not in a same plane (and/or, in some instances, parallel to) a surface of the one or more adjacent panels. A panel may be coupled to an adjacent panel using a hinge or another pivoting component. For example, each of the panel and the adjacent panel may include or be coupled to a rigid edge. The rigid edges may be coupled by a flexible coupling component, such as a piece of fabric.

In FIG. 1A, supporting device 100 includes a first pair of panels: front first panel 105 and back second panel 110. Front first panel 105 includes a front edge 105a and a back edge 105b. Back second panel 110 includes a front edge 110a and a parallel back edge 110b. Front edge 105a and back edge 110b are vertically fixed (due to direct or indirect engagement with an underlying rail system). Back edge 105b and front edge 110a are also vertically fixed. Back edge 110b may be moved close to front edge 105a, thereby causing the front pair of panels to move from the flat positions shown in FIG. 1A to a pointed position shown in FIG. 1B, away from the underlying keyboard 200. Conversely, a second pair of fourth and fifth panels 115 and 120 may be compressed to cause these back panels to move from the flat positions shown in FIG. 1A to a pointed position shown in FIG. 1C, away from underlying keyboard 200. As shown in FIGS. 1A, 1B, and 1C, supporting device 100 can be completely flat within frame 150, one end of the supporting device 100 can form a V-shaped protrusion, and the other end of the supporting device 100 can form a V-shaped protrusion.

As described in further detail below, a default state of supporting device 100 may be to lock a length-wise position of the rail-locked edges. However, a user may be able to temporarily unlock the edges (e.g., by pressing buttons 160) to move the edges to a desired position.

Figure 2A:
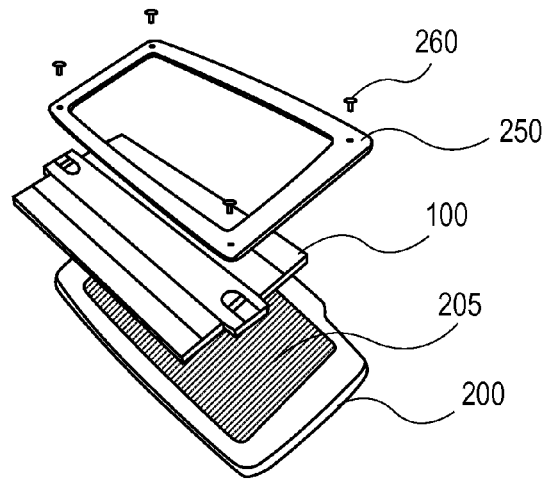
FIG. 2A shows an exploded rear perspective view of a keyboard-supporting device coupled to a keyboard.
Figure 2B:
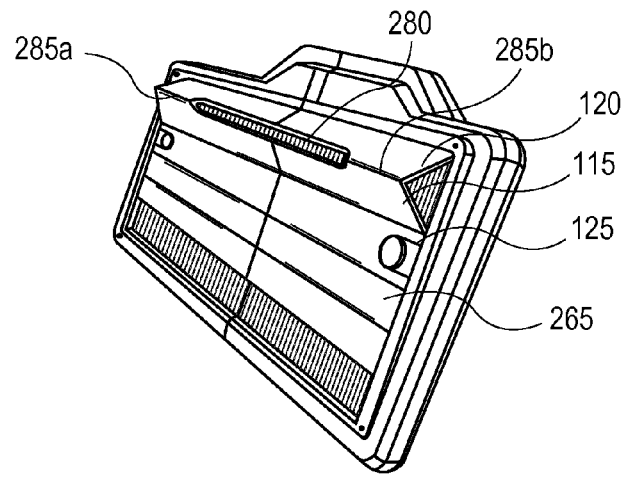
FIG. 2B shows a rear perspective view of a supporting apparatus coupled to a keyboard.
Figure 2C:
FIG. 2C shows a front perspective view of a keyboard-supporting device coupled to a keyboard.

FIGS. 2A-2C show the supporting apparatus coupled to a keyboard 200. As shown in FIG. 2A, keyboard 200 may include a cavity 205 sized to receive supporting device 100. For example, the cavity may have a length and width approximately the same as or slightly larger than a respective length and width of supporting device 100. In some instances, a depth of cavity 205 is approximately the same as a depth of supporting device 100.

As noted above, the supporting apparatus may comprise a restraining unit configured to engage the series of connected panels such that at least one edge of each of four or more panels of the series of connected panels is restricted to movement within a base plane 265. The base plane 265 may be the plane along which the panels lie while the supporting device is completely flat (e.g., as in FIG. 1A). The restraining unit may take the form of a frame 250 in some embodiments. Frame 250 may lock supporting device 100 to keyboard 200. For example, after supporting device 100 is positioned within cavity 205 of keyboard 200, frame 250 may be positioned over supporting device 100. Screws or tabs 260 may then be inserted through apertures of frame 250 to engage keyboard 200.

In some instances, supporting device 100 and/or frame 250 are provided separately from an electronic device. A user may then lock supporting device 100 to an electronic device (e.g., keyboard 200). Such embodiments may allow a user freedom to enjoy tilt flexibility provided by supporting device 100 while simultaneously enjoying the freedom of choosing his preferred electronic device. In some instances, supporting device 100 is provided with an electronic device. For example, supporting device may be fixedly attached to the electronic device and/or attached to the electronic device at a time of sale. Frame 260 may be (e.g., permanently) contiguous with and/or adhered to the electronic device.

As shown in FIG. 2B, panel edges of supporting device 100 may remain free to move along the length-wise axis of the supporting device (so long as the supporting device is not in a locked state). In this instance, movement of third panel 125 towards a back of the supporting device may cause fourth and fifth panels 115 and 120 to compress and form an apex or point. As shown in FIG. 2C, the apex formed by fourth and fifth panels 115 and 120 may cause a back of keyboard 200 to be raised relative to a front of keyboard 200.

In some embodiments, the described movement of the panels may be performed even while a keyboard is positioned over the supporting device—without requiring that the combined device-keyboard system be turned upside down. For example, a user may be able to easily (e.g., and blindly) locate buttons 160 (see FIG. 3) to unlock the supporting device and then slide the panels along axis 150. Pushing buttons 160 may cause supporting device 100 to switch from a locked state (where length-wise position of the rail-locked edges are fixed) to an unlocked state (where the rail-locked edges can move along the length-wise axis 150). In some instances, supporting device 100 remains in the unlocked state while, and only while, button 160 are pushed.

As shown in FIG. 2B, panels may be configured to have contact-improving or stability-improving features. For example, a hole 280 may be formed between panels 115 and 120. Thus, two feet 285a and 285b will contact an underlying surface rather than an extended edge.

In this embodiment, a height of a front or back apex may be finely controlled merely by moving third panel 125 towards a front or back of supporting device 100. A component of the supporting device or the frame may fix or restrain length-wise motion of an extreme edge (e.g., edge 105a). Thus, a movement of a single piece along a single axis allows the user to have a large degree of control over a tilt of a keyboard supported by the supporting device.

Though not shown, other variations are contemplated. In one embodiment, fewer panels (e.g., three) may be included (e.g., panels 115, 120 and 125). Movement of third panel 125 would then allow a height of a single back apex to be adjusted. Flipping supporting device 100 prior to attachment of frame 250 may allow a user the ability to still achieve a positive or negative flip. In one embodiment, no third panel 125 is included. In one embodiment, more than five panels are included.

Figure 3:
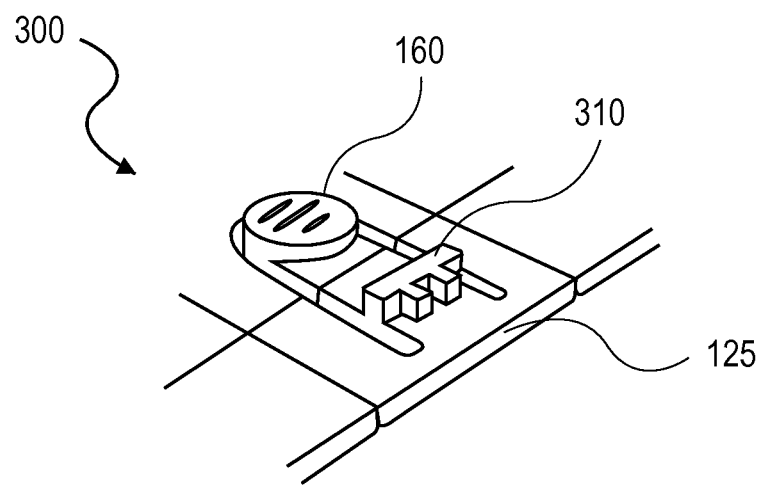
FIG. 3 shows a perspective view of a position-locking component.

FIG. 3 shows a position-locking component 300 according to embodiments of the invention. Position-locking component 300 may include a spring arm that may be positioned on and/or coupled to a panel, such as third panel 125. Position-locking component 300 may include a user-operating feature such as a button 160. Upon activation of the feature (e.g., pressing of the button), position-locking component 300 may move from a default locked state to an unlocked state. In the unlocked state, an associated panel (e.g., third panel 125) may be free to move lengthwise.

When the feature is activated, teeth 310 may move inwards towards button 160. The teeth may then be free to move through a rail guide. When the feature is released from activation, teeth 310 may move outwards away from the button and engage complementary mating teeth present along an outer edge of a rail guide. Close spacing of the teeth 310 may allow a user to finely control a position of panel 125 and thus, a tilt of a keyboard supported by supporting device 100. In one embodiment, teeth 310 are sized and spaced to allow for a user to control a tilt of a supported keyboard with precision of greater than about 5° or 1°.

Figure 4:
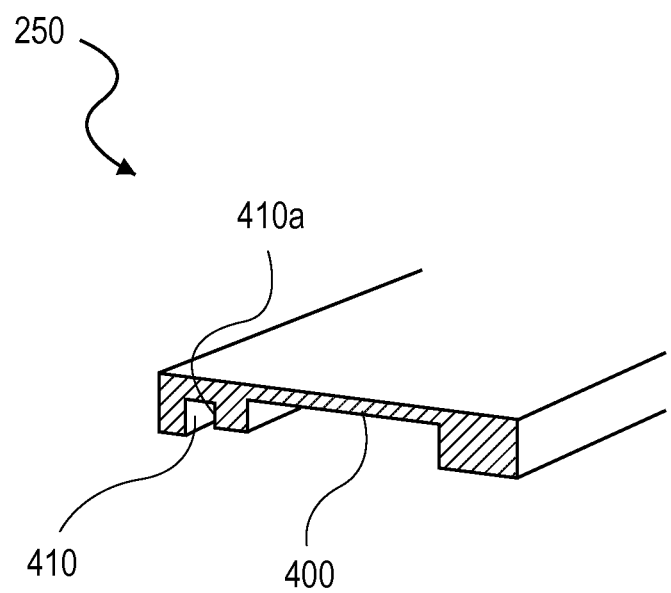
FIG. 4 shows a cross-sectional, perspective of a frame.

FIG. 4 shows a cross section of frame 250. Frame 250 may include a keyboard-receiving feature 405. For example, keyboard receiving feature 405 may include a track configured to wrap around a portion or edge of the keyboard 100.

Frame 250 may further include a rail guide 410. Rail guide 410 may be configured to allow underlying panels to move in a length-wise direction and may be configured to restrain vertical movement of engaged panel edges. Rail guide 410 may further include a locking feature, such as mating teeth that only allows length-wise movement of panels when the locking feature is disengaged. For example, rail guide 410 may include mating teeth along an outer edge 410a of the guide.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. Where approximate or "about" is described for measurements, embodiments herein also contemplate the exact measurement. Where a shape is disclosed, such as a cylinder, embodiments herein contemplate other suitable shapes, such as multi-sided blocks (octagonal structures, decagonal structures, etc.), other rectangular structures, etc. In certain implementations, structures with multiple sides approaching the shape of cylinders, as well as substantially cylindrical shapes (e.g., a cylinder with a flat sidewall portion) may be considered cylinders as described herein, unless otherwise specified.

What is claimed is:

1. A supporting apparatus for supporting an electronic device, the supporting apparatus comprising:
    a supporting device comprising a series of connected planar panels comprising a first panel, a second panel, a third panel, and a fourth panel, and a locking component coupled to an edge region of at least one of the planar panels; and
    a restraining unit engaging the series of connected planar panels such that an edge of each of the first panel, the second panel, the third panel, and the fourth panel is restricted to movement within a base plane, the base plane being aligned with an orientation of the restraining unit, while another edge of each of the first panel, the second panel, the third panel, and the fourth panel is capable of moving out of the base plane.

2. The apparatus of claim 1, wherein the restraining unit comprises a frame.

3. The apparatus of claim 2, wherein the frame comprises rail guides.

4. The apparatus of claim 1, wherein the locking component is configured to fix a position of the edge region along a length-wise axis when the locking component is in a locked state, the length-wise axis being within the base plane.

5. The apparatus of claim 1, wherein the series of connected planar panels further comprise a central panel located between the second and third panels.

6. The apparatus of claim 5, wherein the locking component is coupled to the central panel.

7. The apparatus of claim 1, wherein the supporting device and restraining unit are configured such that, when the locking component is in an unlocked state, the first and second panels may be moved to adjust a height of the another edge of each of the first panel and the second panel relative to the base plane, and
    wherein the supporting device and restraining unit are configured such that, when the locking component is in a locked state, the height of the another edge of each of the first panel and the second panel relative to the base plane is fixed.

8. The apparatus of claim 7, wherein the locking component switches from the locked state to the unlocked state in response to a user exerting pressure on a part of the locking component.

9. The apparatus of claim 1, wherein the locking component comprises a first set of moveable teeth coupled to one or more panels of the series of connected planar panels and further comprises a second set of teeth coupled to the restraining unit.

10. The apparatus of claim 1, wherein the first and second panels are capable of being compressed to form a first apex, and wherein the third and fourth panels are capable of being compressed to form a second apex.

11. The apparatus of claim 1, wherein the edge of each of the first panel, the second panel, the third panel, and the fourth panel is perpendicular to a length-wise axis of the supporting device, wherein the another edge of each of the first panel, the second panel, the third panel, and the fourth panel is also perpendicular to the length-wise axis, and wherein the length-wise axis is within the base plane and traverses through each of the first panel, the second panel, the third panel, and the fourth panel when the series of connected planar panels is substantially flat.

12. A system comprising:
    the supporting apparatus of claim 1; and
    an electronic device supported by the supporting apparatus.

13. The system of claim 12 wherein the electronic device is a keyboard.

14. The apparatus of claim 12, wherein the electronic device comprises a cavity sized to receive the supporting apparatus.

15. A method for supporting an electronic device, the method comprising:
    accessing a supporting apparatus, the supporting apparatus comprising a series of connected planar panels comprising a first panel, a second panel, a third panel, and a fourth panel, and a locking component coupled to an edge region of at least one of the planar panels;
    moving at least one panel of the series of connected planar panels such that an apex is formed via two adjacent panels of the series of connected planar panels; and
    locking the series of connected planar panels such that the apex is fixed, wherein a tilt of the electronic device supported by the supporting device depends on a height of the apex.

16. The method of claim 15, further comprising positioning the electronic device on the supporting apparatus.

17. The method of claim 15, wherein the series of connected planar panels further comprises a central panel located between the second and third panels, and wherein moving the at least one panel comprises moving the central panel to thereby cause compression of the first and second panels.

18. The method of claim 15, wherein locking the series of connected planar panels comprises locking the locking component of the supporting apparatus.

19. The method of claim 15, wherein the security apparatus further comprises a restraining unit configured to engage the series of connected planar panels, the restraining unit defining a base plane, and wherein moving the at least one panel includes restricting movement of an edge of each of the first panel, the second panel, the third panel, and the fourth panel within the base plane, while another edge of each of the first panel, the second panel, the third panel, and the fourth panel is capable of moving out of the base plane to form the apex.

20. The method of claim 19, wherein locking the series of connected planar panels comprises releasing pressure on a part of the locking component of the supporting apparatus to thereby engage a first set of moveable teeth of the locking component with a second set of teeth of the restraining unit.

* * * * *